United States Patent

[11] 3,599,551

| [72] | Inventor | Gerhard Lemme<br>Munich, Germany |
|---|---|---|
| [21] | Appl. No. | 818,188 |
| [22] | Filed | Apr. 18, 1969 |
| [45] | Patented | Aug. 17, 1971 |
| [73] | Assignee | Agfa-Gevaert Aktiengesellschaft<br>Leverkusen, Germany |
| [32] | Priority | Apr. 19, 1968 |
| [33] | | Germany |
| [31] | | P 17 72 245.1 |

[54] FILM-METERING AND SHUTTER-COCKING DEVICE
10 Claims, 1 Drawing Fig.

[52] U.S. Cl. .................................... 95/31 FM, 95/31 AC
[51] Int. Cl. .................................... G03b 1/62, G03b 9/68
[50] Field of Search ............................ 95/31, 34, 55, 11

[56] References Cited
UNITED STATES PATENTS

| 3,148,605 | 9/1964 | Peterson et al. | 95/34 X |
| 3,232,196 | 2/1966 | Sapp, Jr. et al. | 95/55 X |
| 3,489,070 | 1/1970 | Fauth | 95/55 X |
| 3,416,424 | 12/1968 | Harvey | 95/11 X |
| 2,722,872 | 11/1955 | Schrader | 95/31 FSL |

*Primary Examiner*—Samuel S. Matthews
*Assistant Examiner*—Russell E. Adams, Jr.
*Attorney*—Michael S. Striker ABSTRACT: A camera for use with film having a perforation for each film frame and having a shutter blade which can be propelled to open position, a film-transporting wheel, and a one-piece slotted slide which is pivotable about and movable lengthwise of a fixed pin. The slide is biased by a helical spring and has a first arm which is biased by the spring against the film so that the first arm enters a perforation and is entrained by the film to the extent determined by the length of the slot for the pin, a second arm which can propel the shutter blade to open position when the first arm is disengaged from the film by a release, and a third arm which is located in the path of the release when the first arm extends into the perforation and the film is transported by the full length of a frame.

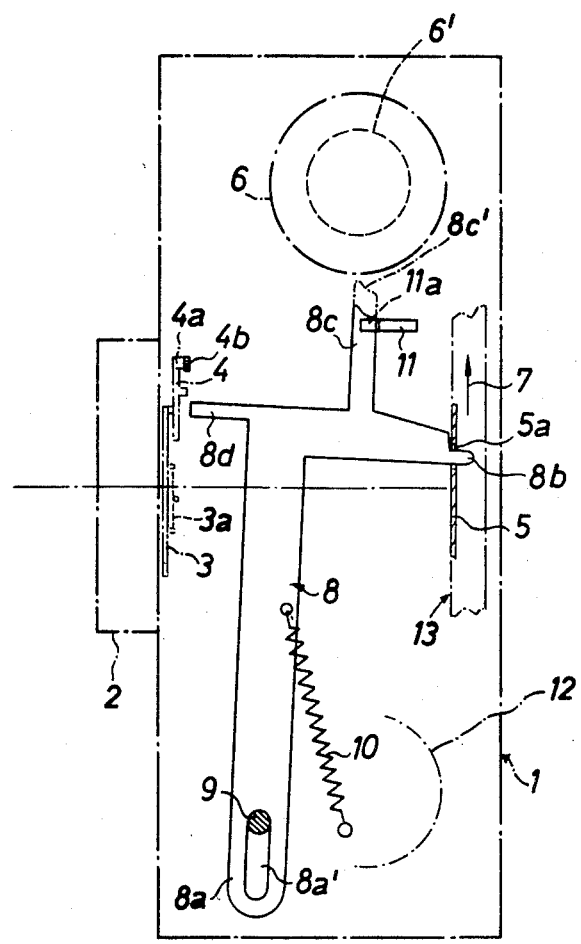

FILM-METERING AND SHUTTER-COCKING DEVICE

BACKGROUND OF THE INVENTION

The present invention relates to photographic apparatus in general, especially to still cameras. More particularly, the invention relates to improvements in cameras which are provided with means for preventing double exposure of film frames. Still more particularly, the invention relates to improvements in cameras for use with film of the type having a perforation for each of its frames.

SUMMARY OF THE INVENTION

An object of the present invention is to provide a camera with a simple, inexpensive and compact but reliable device for preventing double exposure of film frames.

Another object of the invention is to provide a camera wherein a single part can perform the function of means for preventing double exposure of film frames as well as one or more additional advantageous functions.

A further object of the invention is to provide a still camera wherein the shutter cannot be released prior to completed transport of the film by the length of a frame, wherein the film cannot be transported by more than the length of a frame, and wherein repeated operation of the film-transporting mechanism is possible only if successive operations of such mechanism alternate with successive movements of shutter blade or blades to open position.

An additional object of the invention is to provide a still camera wherein the transport of film by more than the length of a film frame can be prevented in several ways.

The invention is embodied in a photographic apparatus which is intended for use with roll film of the type having a row of perforations, one for each film frame. The apparatus comprises shutter blade means movable between open and closed positions and preferably biased to closed position, transporting means (such as a manually rotatable wheel) for transporting the film whereby a portion of the film advances along a predetermined path in the interior of the camera body and behind the lens mount, and control means comprising a one-piece control member movable between first and second positions and having a first portion arranged to track the film along the film path and to enter a perforation during transport of the film by the wheel, a second portion arranged to arrest the control member in second position upon continued transport of film while the first portion extends into a perforation and to thereby terminate the transport, and a third portion arranged to effect movement of the shutter blade means to open position in response to movement of the control member to first position. Movement of the control member to first position is preferably effected by a prestressed spring which permanently urges the control member toward first position and simultaneously urges the first portion of the control member against the film in the film path in each position of the control member. A release member can be provided on the camera body to disengage the first portion from the perforation and to thereby permit movement of the control member to first position.

The novel features which are considered as characteristic of the invention are set forth in particular in the appended claims.

The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIG. is a schematic plan view of a photographic apparatus, with certain parts shown in horizontal section.

DESCRIPTION OF THE PREFERRED EMBODIMENTS

The drawing shows a still camera in plan view, with the top portion of the housing or body 1 removed. The body 1 has a front wall which carries a lens mount 2. The shutter includes a blade 3 which is located behind the objective and is biased to the illustrated closed position by a suitable spring 3a. The shutter further includes an impeller 4 which can propel the blade 3 to open position against the opposition of its spring 3a. This impeller has a motion-receiving portion 4a provided with a cam face 4b. The film 5 is stored on a supply reel 12 and is guided along a film path 13 to be collected by a takeup reel (not shown) located behind a film transporting wheel 6. The film 5 is provided with perforations 5a, one for each of its frames. The arrow 7 indicates the direction in which the film 5 is moved along the path 13 in response to rotation of the transporting wheel 6.

In accordance with a feature of my invention, the camera further comprises a substantially platelike one-piece control member or slide 8 which is provided with a blocking or arresting portion or arm 8a, with a film tracking portion or arm 8b, an actuating portion or arm 8c, and a shutter-driving portion or arm 8d. The arm 8a has an elongated slot 8a' for a fixed guide pin 9. The slide 8 can be made of metallic or synthetic plastic material and performs several functions, namely, blocking further rotation of the film-transporting wheel 6 (arm 8a), tracking or scanning the perforations 5a of the film 5 (by the arm 8b), receiving motion from the release 11 (by way of the arm 8c), operating the impeller 4 (arm 8d), preventing double exposure of film frames (by the arm 8a and/or by a modified version of arm 8c) and, if necessary or desirable, directly blocking the film-transporting wheel 6. A biasing means here shown as a prestressed helical spring 10 is provided to operate between the body 1 and the main portion of the slide 8 to urge the latter to the first position shown in the drawing and to simultaneously bias the arm 8b against the front side of the film 5 so that the tip of this arm automatically enters the next-following perforation 5a when the film is advanced by the wheel 6 (arrow 7). The release 11 is reciprocable and has an inclined cam face 11a which can move the arm 8c in a direction to the left, as viewed in the drawing, to thereby turn the slide 8 in a counterclockwise direction.

The drawing shows the film 5 in an intermediate stage of transport by the length of a frame. The tip of the arm 8b is already received in the adjacent perforation 5a but the transporting wheel 6 continues to move the film in the direction indicated by arrow 7. This causes the film 5 to entrain the slide 8 by the way of the arm 8b whereby the slide stresses the spring 10 and the arm 8a moves its slot 8a' with reference to the guide pin 9 until this pin engages the bottom surface in the slot 8a', as viewed in the drawing, whereby the slide 8 comes to a halt in a second position and its arm 8a prevents further transport of the film 5. This takes place when the film 5 is advanced exactly by the length of a frame so that an unexposed frame is located behind the objective in the lens mount 2. During such movement of the arm 8b with the film 5, the arm 8a slides over and beyond the cam face 4b of the motion receiving portion 4a of the impeller 4.

If the user wishes to make an exposure, the release 11 is pushed downwardly whereby the cam face 11a shifts the arm 8c in a direction to the left so that the slide 8 (in its upper or second position, as viewed in the drawing) pivots in a counterclockwise direction and withdraws the tip of the arm 8b from the perforation 5a. The spring 10 is stressed because the slide 8 is in the upper end position; this spring is free to contract as soon as the tip of the arm 8b leaves the perforation 5a whereby the arm 8d of the slide propels the motion-receiving portion 4a in a downward direction, as viewed in the drawing, and the impeller 4 propels the shutter blade 3 to open position. The impeller 4 can return to the illustrated position, i.e., its portion 4a can bypass the arm 8d when the slide 8 reaches the illustrated first position. The spring 3a propels the shutter blade 3 back to closed position to thus complete the exposure. The slide 8 reaches and remains in the illustrated first position under the action of the spring 10 when the surface at the upper end of the slot 8a' reaches the guide pin 9. The spring 10 is mounted with some initial stress so that it tends to pivot the slide 8 in a clockwise direction whereby the tip of the arm 8b bears against the front side of the film 5. Thus, when the operator thereupon rotates the wheel 6 to transport the film 5 in the direction indicated by arrow 7, the tip of the arm 8b automatically penetrates into the next-following perforation 5a and causes the slide 8 to share the movement of the film in the direction of arrow 7 until the arm 8a is stopped by the guide pin 9. If the operator fails to transport the film 5 by the full length of a frame, depression of the release 11 does not result in counterclockwise pivotal movement of the slide 8 so that the arm 8b remains engaged with the film and the arm 8d cannot strike against the impeller 4. Thus, the slide 8 constitutes an effective means for preventing double exposure of film frames. An exposure can be made only when the arm 8d moves upwardly and beyond the cam face 4b of the motion-receiving portion 4a on the impeller 4, and this takes place only when the film is transported by the full length of a frame, namely, when the pin 9 abuts against the surface at the lower end of the slot 8a'.

The improved camera can be modified in several ways without departing from the spirit of my invention. For example, the arm 8c of the slide 8 can be replaced by a longer arm 8c' ( indicated by broken lines ) which engages a toothed ratchet wheel 6' on the film transporting wheel 6 when the slide reaches its upper end position whereby the tip of the modified arm 8c' engages a tooth of the ratchet wheel 6' and positively blocks further rotation of the wheel 6 when the pin 9 engages the surface at the lower end of the slot 8a'. Furthermore, the arm 8d can be made shorter so that it can readily bypass the portion 4a of the impeller 4 when the slide 8 moves upwardly but is aligned with the portion 4a when the slide begins to pivot in a counterclockwise direction in response to depression of the release 11; the length of the arm 8d is then such that this arm overlaps the portion 4a at least shortly before the arm 8b is disengaged from the film 5. Finally, it is also possible to provide the motion receiving portion 4a directly on the shutter blade 3 so that the blade is directly engaged by the arm 8d when the release 11 causes the arm 8b to become disengaged from the film 5.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

I claim:

1. In a photographic apparatus for use with roll film of the type having a row of perforations, one for each film frame, a combination comprising shutter blade means movable between open and closed positions; transporting means for transporting the film whereby a portion of the film advances along a predetermined path; control means comprising a one-piece control member movable between first and second positions and having a first portion arranged to track the film along said path and to enter an oncoming perforation during transport of the film by said transporting means, a second portion arranged to arrest the control member in said second position upon continued transport of the film while said first portion extends into a perforation and to thereby terminate said transport; and a third portion arranged to effect movement of said shutter blade means to open position in response to movement of said control member to said first position; and release means actuatable to disengage said first portion from the film in the second position of said control member and to thereby permit movement of said control member to said first position.

2. A combination as defined in claim 1, further comprising biasing means for urging said control member to first position and guide means defining a pivot axis for said control member and cooperating with said second portion to arrest the control member in second position.

3. A combination as defined in claim 2, further comprising impeller means arranged to move said blade means to open position in response to impetus received from said third portion during movement of said control member to first position under the action of said biasing means.

4. A combination as defined in claim 2, wherein said biasing means is arranged to store energy in response to movement of said first portion with the film while the film is transported by said transporting means subsequent to entry of said first portion into a perforation.

5. A combination as defined claim 1, further comprising resilient means for urging said blade means to closed position.

6. A combination as defined in claim 1, wherein said second portion comprises an elongated slot and further comprising guide means extending into said slot and cooperating with said second portion to arrest said control member in each of said positions thereof.

7. A combination as defined in claim 1, further comprising biasing means for urging said control member to first position.

8. A combination as defined in claim 7, wherein said control member is pivotable about a fixed axis and wherein said biasing means is arranged to urge said first portion against the film in said path in each position of said control member, said control member further comprising a fourth portion and said release means comprising a cam face operative to engage said fourth portion and to thereby pivot said control member in a direction to disengage the first portion from the film.

9. A combination as defined in claim 1, wherein said control member is a slide and wherein said second portion has an elongated slot, and further comprising fixed guide means extending into said slot and biasing means for urging said control member to first position and for simultaneously urging said first portion against the film, said guide member being received in one end of said slot in the first position and in the other end of said slot in the second position of said control member.

10. A combination as defined in claim 1, wherein said control member comprises a fourth portion which moves into engagement with and blocks said transporting means in response to completed movement of said control member to said second position.